United States Patent
Colket et al.

(10) Patent No.: US 8,215,117 B2
(45) Date of Patent: Jul. 10, 2012

(54) STAGING FOR RICH CATALYTIC COMBUSTION

(75) Inventors: Meredith B. Colket, Simsbury, CT (US); Alexander Chen, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 1129 days.

(21) Appl. No.: 11/974,562

(22) Filed: Oct. 15, 2007

(65) Prior Publication Data
US 2009/0094984 A1 Apr. 16, 2009

(51) Int. Cl.
F02C 7/22 (2006.01)
F02C 7/26 (2006.01)

(52) U.S. Cl. ........ 60/777; 60/723; 60/733; 60/39.822; 431/7; 431/170; 431/268; 431/278; 431/285; 431/326; 431/328; 431/350

(58) Field of Classification Search ............ 60/777, 60/723, 39.822, 733; 431/7, 170, 268, 278, 431/285, 326, 328, 350
See application file for complete search history.

(56) References Cited

U.S. PATENT DOCUMENTS

| | | | |
|---|---|---|---|
| 5,161,366 A | 11/1992 | Beebe | |
| 5,232,357 A * | 8/1993 | Dalla Betta et al. | 431/7 |
| 5,235,804 A | 8/1993 | Colket, III et al. | |
| 5,622,054 A | 4/1997 | Tingle | |
| 5,685,156 A | 11/1997 | Willis et al. | |
| 5,850,731 A | 12/1998 | Beebe et al. | |
| 6,174,159 B1 | 1/2001 | Smith et al. | |
| 6,358,040 B1 * | 3/2002 | Pfefferle et al. | 431/7 |
| 6,394,791 B2 | 5/2002 | Smith et al. | |
| 6,460,345 B1 | 10/2002 | Beebe et al. | |
| 6,619,043 B2 | 9/2003 | Bruck et al. | |
| 6,748,745 B2 | 6/2004 | Ul Karim et al. | |
| 7,117,674 B2 | 10/2006 | Sprouse et al. | |
| 7,127,899 B2 | 10/2006 | Sprouse et al. | |
| 7,421,843 B2 * | 9/2008 | Laster et al. | 60/777 |
| 7,727,495 B2 * | 6/2010 | Burd et al. | 422/312 |
| 2006/0080967 A1 * | 4/2006 | Colket, III | 60/777 |

* cited by examiner

Primary Examiner — William H Rodriguez
Assistant Examiner — Craig Kim
(74) Attorney, Agent, or Firm — Kinney & Lange, P.A.

(57) ABSTRACT

A catalytic reactor for a gas turbine engine comprising an air inlet, a premixing zone, a reacting zone comprising a reactive portion and a nonreactive portion, a post reaction mixing zone, a first fuel injection system for introducing fuel into the reactive portion, and a second fuel injection system for introducing fuel into the nonreactive portion.

17 Claims, 5 Drawing Sheets

STAGING FOR RICH CATALYTIC COMBUSTION

BACKGROUND

It has long been known that exhaust gases produced by combusting hydrocarbon fuels can contribute to atmospheric pollution. Exhaust gases typically contain pollutants such as nitric oxide (NO) and nitrogen dioxide (NO2), which are frequently grouped together as NOx, unburned hydrocarbons (UHC), carbon monoxide (CO), and particulates, primarily carbon soot. Nitrogen oxides are of particular concern because of their role in forming ground level smog and acid rain and in depleting stratospheric ozone. NOx may be formed by several mechanisms. The high temperature reaction of atmospheric oxygen with atmospheric nitrogen, particularly at adiabatic flame temperatures above about 2800° F., forms NOx through the thermal or the Zeldovich mechanism ("thermal NOx"). The reaction of atmospheric nitrogen with hydrocarbon fuel fragments (CHi), particularly under fuel-rich conditions and within flame fronts, forms NOx through the prompt mechanism ("prompt NOx"). The formation of prompt NOx can be enhanced through the formation of superequilibrium concentrations of reactive radicals in flame fronts. The reaction of nitrogen released from a nitrogen-containing fuel with atmospheric oxygen, particularly under fuel-lean conditions, forms NOx through the fuel-bound mechanism ("fuel-bound NOx"). In typical combustors, atmospheric oxygen and nitrogen are readily available in the combustion air which is mixed with the fuel.

While acknowledging a need to control atmospheric pollution, the more early combustion control schemes were designed to maximize combustion efficiency to maintain economic operation with only a secondary regard for pollutant emissions. For example, the production of CO and UHC was considered undesirable, more because it indicated poor combustion efficiency than because CO and UHC are pollutants. To maximize combustion efficiency and flame stability, fuel is often burned in a diffusion flame at fuel/air ratios as near as possible to the stoichiometric ratio, that is, at equivalence ratios of slightly less than 1.0. The equivalence ratio is the ratio of the actual fuel/air ratio to the stoichiometric fuel/air ratio. An equivalence ratio of greater than 1.0 indicates fuel-rich conditions, while an equivalence ratio of less than 1.0 indicates fuel-lean conditions. Burning a fuel at an equivalence ratio slightly less than 1.0 produces nearly complete combustion, minimizing CO and UHC production, and a hot flame, maximizing usable energy. The temperatures produced during such an operation are high enough to produce appreciable quantities of thermal NOx. Therefore, the goal of achieving good thermal efficiency, which arises from economic concerns, is seemingly at odds with the goal of minimizing NOx emissions, which arises from environmental concerns and is required by increasingly stringent environmental regulations.

Several fairly simple methods are available to decrease NOx emissions, although none are entirely satisfactory. For example, the formation of fuel-bound NOx can be minimized or avoided entirely by burning a low nitrogen or nitrogen-free fuel. However, burning a low nitrogen fuel does nothing to reduce the formation of thermal or prompt NOx. The formation of thermal NOx can be reduced by operating under uniformly fuel-lean conditions, such as by using a lean premixed system or a lean prevaporized and premixed (LPP) system. LPP systems would be needed for liquid fueled systems that require very low NOx emissions. The excess air used to achieve fuel-lean combustion acts as a diluent to lower flame temperatures, thereby reducing the amount of thermal NOx formed. The formation of prompt NOx can also be reduced by operating under fuel-lean conditions because the excess air decreases the concentration of CHi available to react with atmospheric nitrogen. However, the extent to which thermal and prompt NOx formation can be reduced by fuel-lean premixed or LPP combustion may be limited by flame instability which occurs at very lean conditions.

Accordingly, what is needed in the art is a method and system for efficiently combusting hydrocarbon fuels while minimizing pollutant emissions, particularly NOx emissions.

SUMMARY

In one embodiment, a catalytic reactor for a gas turbine engine has an air inlet, a premixing zone, a reacting zone comprising a reactive portion and a nonreactive portion, a post reaction mixing zone, a first fuel injection system for introducing fuel into the reactive portion, and a second fuel injection system for introducing fuel into the nonreactive portion.

In another embodiment, a catalytic reactor for a gas turbine engine has a plurality of reacting channels, each reacting channel comprising an inlet end, an outlet end, an interior surface, and an exterior surface. A portion of an interior of each channel is coated with a catalyst. The catalytic reactor also has a plurality of nonreacting channels adjacent the reacting channels comprising an inlet end, an outlet end, an interior surface, and an exterior surface. A plurality of fuel injectors located adjacent the inlet end of each of the plurality of reacting channels introduce fuel into the reacting channels; and a plurality of fuel injectors located adjacent the inlet end of each of the plurality of nonreacting channels introduce fuel into the nonreacting channels.

In another embodiment, a method of operating a gas turbine catalytic combustion system is disclosed. Air is supplied to a catalytic reactor having a plurality of catalyst coated reactive channels and a plurality of nonreactive channels. A first portion of hydrocarbon fuel is injected into the reaction channels for oxidizing the fuel to create a first fluid, while a second portion of the fuel is injected into the nonreactive channels to create a second fluid. The first and second fluids are mixed upon leaving the channels, and the mixture is combusted.

DETAILED DESCRIPTION

A typical gas turbine engine includes a compressor section, a combustion section, and a turbine section, which are all commonly known within the art. The compressor section takes a fluid, typically air, and compresses or pressurizes the fluid, which is then mixed with fuel in the combustion section. The combustion section includes a number of circumferentially spaced combustor assemblies. As the fuel and air mixture is burned in the combustor assemblies, the exhaust is directed to the turbine section. The exhaust turns the blades contained within the turbine, which are connected to one or more shafts for driving the compressor section.

Figure 1:
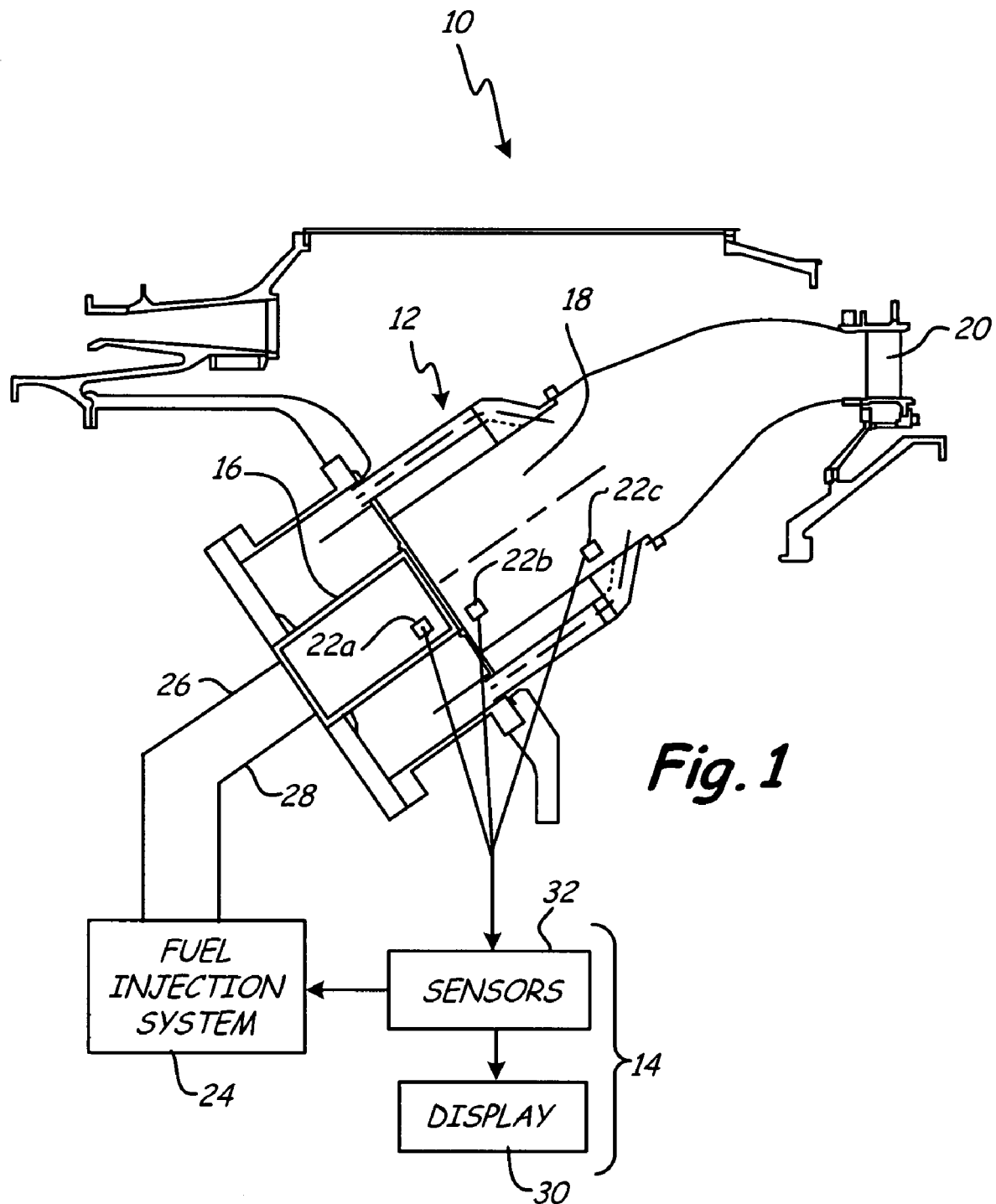
FIG. 1 is a cross-sectional view of a combustor assembly for a gas turbine engine connected to a fuel control system.

FIG. 1 is a cross-sectional view of a combustor assembly 12 for a gas turbine engine 10 connected to a fuel control system 14. Combustor assembly 12 includes a catalytic reactor 16 and combustion chamber 18. Fuel passes from fuel control system 14 through catalytic reactor 16 and is ignited upon exiting into combustion chamber 18 and burned. Fuel and air passing through catalytic reactor 16 will partially react with a catalyst to reduce NOx emissions during burning of the fuel. The reaction may create heat that is transferred to the fuel and air prior to combustion, which will also help reduce NOx emissions. The exhaust leaving combustion chamber 18 of engine 10 is used to power turbine blades 20.

Fuel control system 14 has sensors 22a-22c, fuel injection system 24 with first fuel line 26 and second fuel line 28, and display 30. Sensors 22a-22c may be thermocouples that read the temperature at various areas of combustor assembly 12, or similar structures capable of reading a parameter. Fuel injection system 24 contains a fuel source, valves, and fuel distribution equipment including fuel lines 26, 28 and injectors, which are common in turbine engines. First and second fuel lines 26 and 28 allow for the introduction of fuel into catalytic reactor 16 at different areas and in different amounts.

Sensors 22a-22c relay a signal representing the parameter to control 32. Control receives the signal and transmits the signal to display 30. Display 30 may be a gage, LCD screen, light, or similar equipment that the engine operator can perceive. Control 32 regulates the fuel injection system, including the flow rates of fuel passing through first and second fuel lines 26 and 28.

Figure 2:
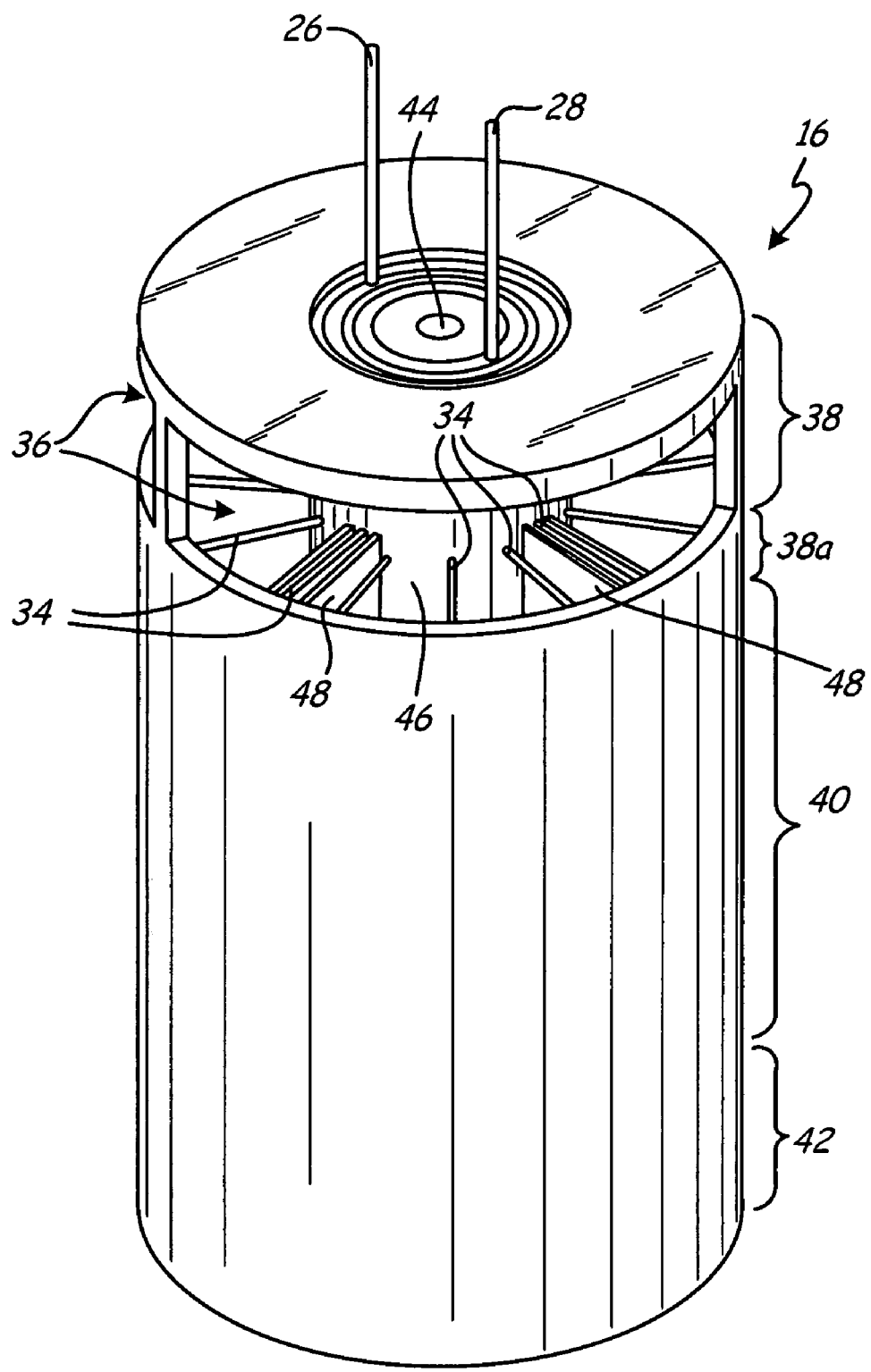
FIG. 2 is a perspective view of a catalytic reactor portion of the combustor assembly.

FIG. 2 is a perspective view of one embodiment of catalytic reactor 16. Catalytic reactor 16 has fuel injectors in the form of fuel spokes 34, air inlets 36, premixing zone 38, reacting zone 40, post reaction mixing zone 42, and central passage 44. In a typical catalytic reactor 16, fuel and air are directed to the fuel spokes 34 and air inlets 36, and into air entry plenum 38. Premixing zone 38a just downstream of the fuel spokes 34 is where the fuel and air initially make contact. A portion of the air becomes cooling air, traveling through nonreactive channels 46 to cool the reacting channel 48. The remaining air is mixed with fuel through catalytic or reactive channels 48, where the fuel is partially oxidized. Catalytic reactor 16 also contains central passage 44, which may be used to direct fluid for flame stabilization. The fluid could be fuel, fuel/air mixture, or air depending on the conditions present.

Reactive channels 48 and nonreactive channels 46 extend downstream from air entry plenum 38. In one embodiment, air entry plenum 38 may contain a swirl inducing structure to premix fuel and air. Upstream from the air entry plenum 38 are first and second fuel lines 26, 28, and air inlets 36. Fuel lines 26, 28 direct fuel to fuel spokes 34. Air inlet 36 provides a passage for cooling air to enter the nonreactive channels 46 and air to the reacting channel 48.

Figure 3:
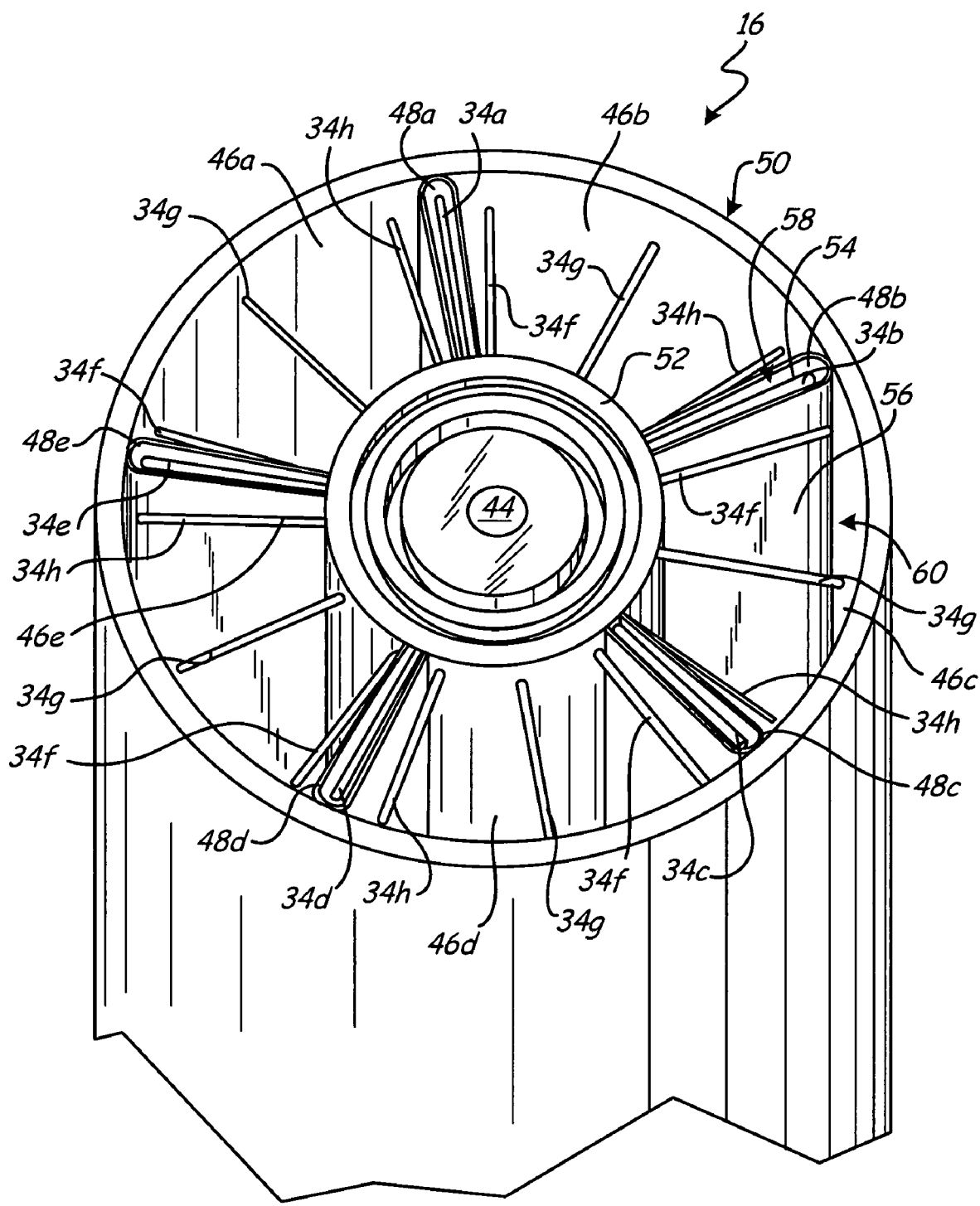
FIG. 3 is a perspective view of the catalytic reactor with a premixing section removed.

FIG. 3 is a perspective view of catalytic reactor 16 with a portion of the air entry plenum 38 removed. In this view, five reactive channels 48a-48e and five nonreactive channels 46a-46e are visible. Fuel injectors in the form of a plurality of fuel spokes 34a-34e are contained within or immediately upstream from reactive channels 48a-48e, while the remaining fuel spokes, including 34f-34h, are contained within or immediately upstream from the nonreactive channels 46a-46e. Fuel spokes 34a-34e are connected to one fuel line 26, while the remaining fuel spokes are connected to 28 (see FIGS. 1 & 2).

Fuel spokes 34a-34h are injectors designed to obtain a good fuel distribution from the fuel injection system 24. In one embodiment, fuel spokes 34 are generally airfoil shaped structures, that is, are shaped like an inverted tear drop. Fuel spokes of this embodiment contain a cross section that is a circular tube with a triangular or trapezoidal shaped faring on the downstream side. The upstream side of each fuel spoke 34 is rounded, which allows for the smooth flow of air over the upstream surface. The fuel spoke 34 contains a series of holes that allow for the injection of fuel from the spoke. In alternate embodiments, fuel spokes 34 are generally cylindrical in shape, or any other common fuel injector known within the art. Although illustrated as one fuel spoke 34a-34e per reactive channel 48, three fuel spokes 34f-34h per nonreactive channel 46, five reactive channels 48 and five nonreactive channels 46, those of skill in the art will recognize that the number of fuel injectors per channel and the number of channels may vary.

In addition to the structures which create reactive channels 48a-48e, catalytic reactor 16 contains outer cylinder 50 and inner cylinder 52 containing central passage 44. Reactive channels 48a-48e are constructed from a piece of material that has two generally parallel sides joined by an arc in the material at one end. The wall opposing the arc is provided by inner cylinder 52. Alternatively, the outer cylinder 50 can act as the arc. Outer cylinder 50, inner cylinder 52, and the walls of reactive channels 48 can be constructed from the same substrate. In one embodiment, the substrate used to construct catalytic reactor 16 is fabricated from high-temperature materials such as high temperature nickel alloy. In alternate embodiments, high temperature metal alloys are used, including alloys composed of iron, nickel, and/or cobalt, in combination with aluminum, chromium, and/or other alloying materials. Other substrate materials include ceramics, metal oxides, intermetallic materials, carbides, and nitrides. Metallic substrates and refractories are most preferred due to their excellent thermal conductivity, allowing effective backside cooling of the catalyst.

A catalyst is deposited onto a portion of reactive channels 48. When the fuel is a hydrocarbon or hydrocarbon oxygenate, and the oxidizer is oxygen or air or a combination thereof, the catalyst may include group VIII noble metals, base metals, metal oxides, or a combination thereof. Elements including zirconium, vanadium, chromium, manganese, copper, platinum, palladium, ruthenium, osmium, iridium, rhodium, cerium, lanthanum, other elements of the lanthanide series, cobalt, nickel, and iron, as well as chromium oxides, cobalt oxides, and alumina, or mixtures thereof.

In one embodiment, the catalyst is applied directly to the substrate of the reactive channel 48. In an alternate embodiment, a bonding coat or washcoat composed of such materials as alumina, silica, zirconia, titania, magnesia, yttrium, other refractory metal oxides, or a combination thereof, is applied to the substrate of reactive channel 48. The catalyst is then deposited onto the bonding coat or washcoat.

In one embodiment, the catalyst is only deposited on interior surface 54 of the reactive channel 48. The deposition of the catalyst may be along the entire length of the channel, or only a portion. Also, in one embodiment, a coating is applied to outer surface 56 of the reactive channel 48. The coating will suppress reaction of the fluid flowing against outer surface 56. In an alternate embodiment, outer surface 56 contains a geometry that suppresses catalytic reaction.

A first fluid comprising fuel/air mixture is introduced into reactive channel 48 at the channel inlet 58 where fuel from the fuel spokes 34a-34e and air from the air entry plenum 38 are premixed. A second fluid, either air or additional fuel/air mixture, is introduced into nonreactive channels 46 at inlet 60 where fuel from the fuel spokes 34f-34h and air from the air entry plenum are mixed, the second fluid absorbing the heat of the catalytic reaction to lower the temperature of the first fluid and the wall of the reacting channels 48.

Figure 4:
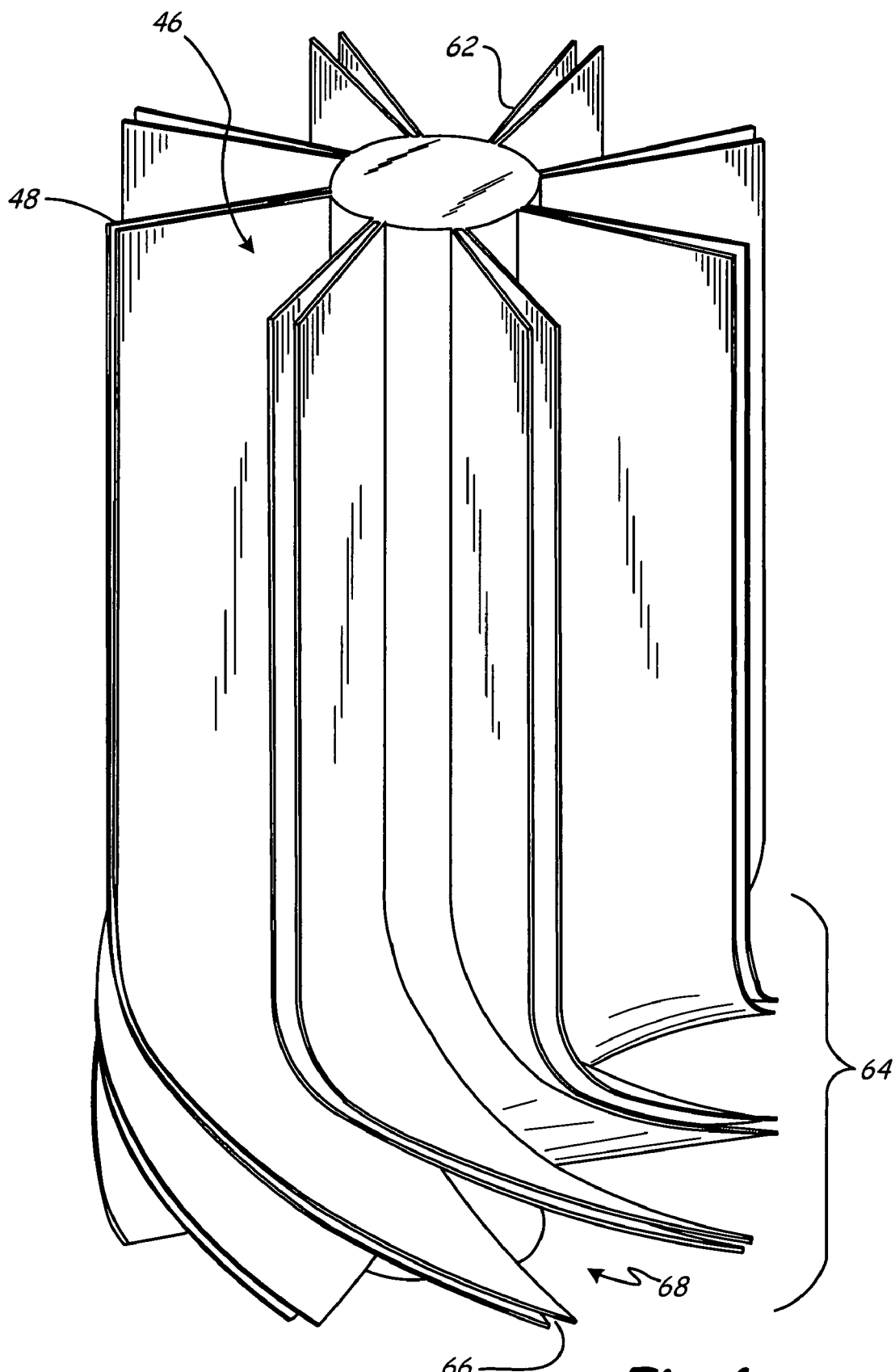
FIG. 4 is a plan view of the internal structure of the catalytic reactor of FIG. 3.

FIG. 4 is a perspective view of an internal structure 62 of an alternate embodiment of catalytic reactor 16. In this view, outer cylinder 50 has been removed. Illustrated are eight each of reactive channels 48 and nonreactive channels 46. In this embodiment, outer cylinder 50 is used to provide the closing wall for reactive channel 48. The number of channels (both reactive and cooling) will vary depending on the application, i.e. engine size and type. Channels 46 and 48 are parallel for a substantial portion of the length of internal structure 62. However, the bottom, or downstream portion 64 of internal structure 62 contains a twist. The twist creates a swirl of the air, fuel, reaction products, and air and fuel mixture exiting the reactor. The swirl promotes mixing of the reacted fuel and other fluids to aid in more uniform combustion. The twist is one embodiment of post reacting mixing zone 42. Those of skill in the art will recognize different ways to promote mixing of the fluids leaving catalytic reactor 16. "Post reacting" indicates that the catalytic reaction has been initiated prior to reaching this zone. The reaction may be continued through this zone, or may be substantially completed by the time the fluids reach the beginning of the zone. The fluids within channels 46 and 48 exit at their respective outlets 68 and 66.

Figure 5:
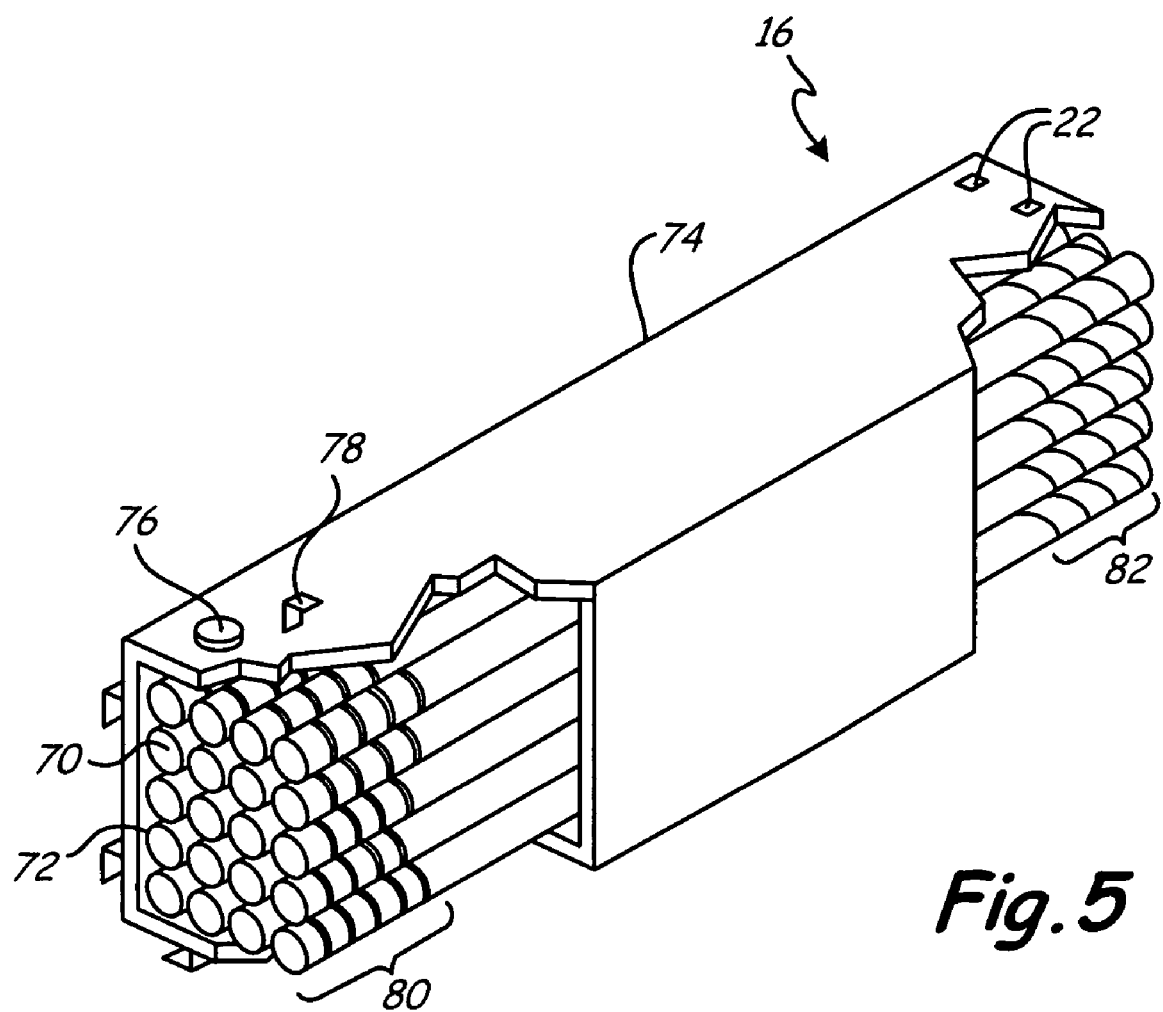
FIG. 5 is a perspective view of an alternate embodiment of the catalytic reactor for a gas turbine engine.

FIG. 5 is a perspective view of an alternate embodiment of catalytic reactor 16. In this embodiment, a first fluid of fuel or fuel/air mixture enters the catalytic tubes 70 at or near entrance 72, with fuel nozzle(s) adjacent catalytic tube 70 (not illustrated). Simultaneously, a second fluid comprising air is introduced into the nonreactive flow paths between adjacent catalytic tubes 70 and housing 74 through inlet aperture 76. Although only a single inlet aperture 76 is visible in FIG. 5, there may be a plurality of inlet apertures located adjacent entrance 72. Fuel injection nozzles 78, which may be adjacent to each inlet aperture 74, allow for the introduction of fuel into the nonreactive flowpath.

Catalytic tubes 70 are similar to reactive channels 48. The interior surfaces of catalytic tubes 70 contain a catalyst that reacts with the first fluid and generates heat. The second fluid acts a cooling fluid and absorbs the heat generated by the reaction. The flow adjacent the exterior of catalytic tubes 70 is slowed upon entering the catalytic reactor by the presence of flow impediment structures 80, which act to adjust the rate of heat transfer near the entrance by keeping the cooling air in contact with the first portion of the catalytic tube 70. Catalytic reactor 16 contains a post reaction mixing zone 82. In this zone, each individual catalytic tube 70 contains a structure to promote swirl and mixing of the fluid leaving catalytic reactor 16.

Catalytic reactor also contains sensors 22. In one embodiment, sensors 22 are thermocouples that read the temperature near the exit of the reactor. In alternate embodiments, sensors 22 take readings of fluid density, pressure, or other parameters that will be transmitted to either the operator (via display 30 of FIG. 1) or to an automated control system. The operator (or control system) will make adjustments to the amount of fuel being injected into either the catalytic tubes 70 or nonreacting channels or flowpaths based on the readings received.

With the aforementioned structure, an improved method of operating a combustor section is possible. In previous systems, most or all of the fuel is injected into the reaction side channels of catalytic reactors, with the exception for some of the fuel being reserved for diffusion flame pilot as needed for flame stability. Similarly, air is split between reacting channels and cooling channels, except for some wall cooling air and air directed downstream of the main flame for dilution. This is to maintain wall integrity and thus extend the useful life of the combustor system. These airflow splits are defined by original geometric designs, including active, passive, or other flow control, and together with overall firing rates (e.g. fuel flow rates), the overall equivalence ratio within the catalytic reactive and nonreactive passages are defined and may be dependent on overall firing rates. The heat release is controlled by flow rates, catalysts, and reaction pathway geometry.

With the current invention, the fuel is split between the reaction side and the cooling side of the catalytic reactor (and heat exchanger, if present). By installing more fuel nozzles, as well as sensors to control the fuel delivery, the combustion systems can be modified to provide for the introduction of fuel into the cooling side (nonreactive side) of the catalytic reactor. Injecting some of the fuel within the cooling passages of the nonreactive channels premixes the fuel and air prior to the discharge of the fluids from the catalytic system. This will reduce the length required for the post reaction mixing zone 42 to achieve required mixing prior to final combustion in the post flame zone. When fuel is introduced into the nonreacting channels, this allows the fluid in the nonreacting channel to absorb more energy without the usual increase in temperature of cooling air alone, due to the higher specific heat of the fuel/air mixture than air alone. In addition, with some of the fuel flowing in the nonreactive channels, more air mass will be passed through as well, allowing for further heat capacity in these cooling gases. Alternately, for the same length reactor and premix zone, the level of mixing will increase to further minimize NOx emissions for combustion at the same firing rate.

For example, air is supplied to catalytic reactor having a plurality of catalyst coated reactive channels and a plurality of nonreactive channels. A first portion of fuel is injected into the reaction channels for oxidizing a hydrocarbon fuel to create a first fluid, while a second portion of fuel is injected into the nonreactive channels to create a second fluid. The first and second fluids are mixed upon leaving the channels, and the mixture is combusted. A parameter of the first fluid prior to its exiting the plurality of reactive channels is read by one of the sensors 64 contained on the catalytic reactor. In one embodiment, the reading is transmitted to a display such as a gage or LED. An operator can use this reading to manually adjust the amount of fuel being introduced into the reactive channels, nonreactive channels, or both. Alternately, a parameter of the second fluid may be read and be used to adjust the introduction of fuel into the catalytic reactor. In an alternate embodiment, a control system will utilize the parameter reading to automatically adjust either the portion of fuel in the reactive channel, a nonreactive channel, or both. In this manner, the total fuel burned remains constant for a given firing rate, but the split between the fuel directed to the reacting channels, the non-reacting channels, and a pilot can be modified depending on constraints due to wall temperatures, flame stability and combustion dynamics, or emissions. Depending on needs, all of the fuel may be directed to one of these three routes or to only two.

The ability to adjust the fuel split between the nonreactive and the reaction channels allows for increased flexibility in hardware design to appropriately match pressure drops, or to correct for unanticipated changes in the flow system. For example, when different reactor designs are employed, changes are required due to other system constraints, it is common to alter the air flow split between the nonreacting and reacting channels. With the ability to adjust the fuel flow split between the two sets of channels, local equivalence ratios on the reacting side can be controlled without changing the air flow split which is often achieved by costly geometric changes of the design.

The current disclosure presents a significant advantage to providing a combustor section with low NOx and CO emission. The catalytic system as disclosed is generally less prone to dynamic combustion problems compared to other lean premixed, low NOx combustor systems. If combustion dynamics become a problem with the introduction of fuel into the reaction channels, the amount of heat released in the catalyst relative to that in the main flame can be altered by modifying the fuel flow split between the reaction side (reactive channels) and the cooling side (nonreactive channels) of the catalytic system. Also, during part power operation, the fuel flow split can be altered as required to maintain flame stability. For example, more fuel is distributed to the reaction side, and thus more fuel is converted to H2 and CO to enhance lean limit stability.

Another advantage comes from the ability to adjust the catalytic system based on the ambient conditions. Ambient conditions, such as humidity and inlet air temperature and pressure, affect the performance of the engine. Changes in these parameters can alter flame stabilization, combustion dynamics, and/or NOx emissions. By controlling the split of the fuel flow between the cooling passages and reaction passages, deleterious effects of ambient conditions can be mitigated.

Normally, when full power conditions are relaxed, fuel flow rates and local fuel-air ratios are decreased. On the fuel-lean side of stoichiometric conditions, this change leads to a drop in temperature. On the fuel-rich side the opposite occurs. If the system is designed for catalyst-safe operation, i.e., below a certain limiting temperature, then, when partial power conditions are required and less fuel is required, the fuel-rich temperatures, and the local catalyst temperature will approach or exceed safe operating temperatures for the catalyst. The invention as disclosed can eliminate this problem by designing full power conditions to include a portion of the fuel to be added to the cooling stream. Two important advantages can be achieved. First, when partial power conditions are needed, the fuel from the cooling side can be reduced preferentially, to a limit imposed by the quantity of fuel desired in the cooling side. Subsequently, fuel from the reacting side can be reduced, but since less percentage of fuel will be removed from this channel, the final reaction side temperature is much lower than it would be, had no fuel initially be diverted to the cooling side at full power. Second, the specific heat of the cooling side passage is raised due to the presence of a penta-atomic species (in the case of methane or natural gas) which has many more degrees of freedom for storing energy than does air composed principally of diatomic species. In addition to the above, by not catalytically oxidizing the portion of the fuel passing through the cooling passage, less heat is released and temperatures are controlled.

In advanced combustor systems, the inlet temperatures may be increased so high that suppression of flame initiation along the hot walls of the nonreacting channel may not be possible. In such case, this system can be redesigned as to avoid excessive diffusion of the fuel injected from the fuel spokes 34f-34h into the nonreacting channels. This may be accomplished by utilizing only 34g for fuel injection into the nonreacting channels to keep the fuel in the non-reacting regions near to the centerline and away from the hot walls, while still offering premixing and large heat capacity for cooling. Thus most of the advantages of this invention can be still be gained through small modifications in the implementation.

The present invention may be run on a closed loop system. That is, fuel distribution between reacting and nonreacting channels will be determined according to the sensor readings and either automatic or manual adjustments may be made in response to the sensor readings. In an alternate embodiment, the system runs on an open loop. Fluid flows through each channel are scheduled depending on power requirements as the engine is ramped up or ramped down. The schedule can be determined by known readings or experimentation and modeling of engine performance. The open loop system adjusts the fuel and air flows through the reacting and nonreacting channels according to a predetermined schedule to avoid dynamic instability of the system.

Although the present invention has been described with reference to preferred embodiments, workers skilled in the art will recognize that changes may be made in form and detail without departing from the spirit and scope of the invention.

The invention claimed is:

1. A catalytic reactor for a gas turbine engine comprising:
a plurality of reacting channels, each reacting channel comprising an inlet end, an outlet end, an interior surface, and an exterior surface, wherein a portion of an interior of each channel is coated with a catalyst;
a plurality of nonreacting channels adjacent the reacting channels, each nonreacting channel comprising an inlet end, an outlet end, an interior surface, and an exterior surface;
a first set of fuel injectors connected to a first fuel injection system, at least one fuel injector of the first set located adjacent the inlet end of each of the plurality of reacting channels for introducing fuel into the reacting channels; and
a second set of fuel injectors connected to a second fuel injection system, at least one fuel injector of the second set located adjacent the inlet end of each of the plurality of nonreacting channels for introducing fuel into the nonreacting channels.

2. The catalytic reactor of claim 1 further comprising:
a post reaction mixing zone containing a structure that promotes mixing of a first fluid leaving the reacting channels and a second fluid leaving the nonreacting channel.

3. The catalytic reactor of claim 1 wherein the exterior of the reacting channel suppresses catalytic reaction.

4. The catalytic reactor of claim 3 wherein the exterior surface of the reacting channel contains a coating compound that inhibits catalytic reaction of a hydrocarbon fuel.

5. The catalytic reactor of claim 1 wherein the catalyst is selected from the group consisting of group VIII noble metals.

6. A catalytic reactor for a gas turbine engine comprising:
an air inlet;
a premixing zone;
a reacting zone, the reacting zone comprising a reactive portion and a nonreactive portion;
a post reaction mixing zone;
a first fuel injection system for introducing fuel into the reactive portion; and
a second fuel injection system for introducing fuel into the nonreactive portion.

7. The catalytic reactor of claim 6 further comprising:
a plurality of sensors along the reactor to provide signals representing a sensed parameter.

8. The catalytic reactor of claim 7 further comprising:
a control system for adjusting the amount of fuel distributed by the first fuel injection system and the second fuel injection system based on the sensed parameter.

9. The catalytic reactor of claim 6 wherein the reactive portion comprises:
an inlet end, and outlet end, an interior surface, and an exterior surface, wherein a portion of the interior surface is covered with a catalyst.

10. The catalytic reactor of claim 6 wherein the nonreactive portion comprises:
an inlet end, and outlet end, an interior surface, and an exterior surface, wherein a portion of the exterior surface suppresses catalytic reaction of hydrocarbon fuels.

11. A method of operating a gas turbine catalytic combustion system, the method comprising:
supplying air to catalytic reactor having a plurality of catalyst coated reactive channels and a plurality of nonreactive channels;
injecting a first portion of fuel for combustion from a first fuel injection system into the plurality of catalyst coated reactive channels for oxidizing a hydrocarbon fuel to create a first fluid;
injecting a second portion of fuel for combustion from a second fuel injection system into the plurality of nonreactive channels to create a second fluid;
mixing the flow of the first fluid leaving the reactive channels with the second fluid exiting the nonreactive channels; and
combusting the mixture of the first fluid and second fluid.

12. The method of claim 11 further comprising:
sensing a parameter of the first fluid prior to its exiting the plurality of reactive channels; and
transmitting a signal based on the parameter sensed.

13. The method of claim 12 further comprising:
adjusting the first portion of fuel being injected into the plurality of reactive channels based on the sensed parameter.

14. The method of claim 12 further comprising:
adjusting the second portion of fuel being injected into the plurality of nonreactive channels based on the sensed parameter.

15. The method of claim 11 further comprising:
sensing a parameter of the second fluid prior to its exiting the plurality of nonreactive channels; and
transmitting a signal based on the parameter sensed.

16. The method of claim 11 wherein the system is an open loop control system.

17. The method of claim 11 wherein the system is a closed loop control system.

* * * * *